United States Patent [19]

Aono

[11] Patent Number: 4,965,764
[45] Date of Patent: Oct. 23, 1990

[54] MEMORY ACCESS CONTROL SYSTEM

[75] Inventor: Fumio Aono, Tokyo, Japan

[73] Assignee: NEC Corporation, Tokyo, Japan

[21] Appl. No.: 168,888

[22] Filed: Mar. 3, 1988

[30] Foreign Application Priority Data

| Mar. 4, 1987 | [JP] | Japan | 62-47701 |
| Mar. 4, 1987 | [JP] | Japan | 62-47702 |
| Mar. 4, 1987 | [JP] | Japan | 62-47704 |

[51] Int. Cl.⁵ .......................................... G06F 12/00
[52] U.S. Cl. ............................. 364/900; 364/926.92; 364/968; 364/948.34
[58] Field of Search ... 364/200 MS File, 900 MS File

[56] References Cited

U.S. PATENT DOCUMENTS

| 4,317,168 | 2/1982 | Messina et al. | 364/200 |
| 4,345,309 | 8/1982 | Arulpragasam et al. | 364/200 |
| 4,392,200 | 7/1983 | Arulpragasam et al. | 364/200 |
| 4,546,430 | 10/1985 | Moore et al. | 364/200 |

Primary Examiner—Thomas M. Heckler
Attorney, Agent, or Firm—Foley & Lardner, Schwartz, Jeffery, Schwaab, Mack, Blumenthal & Evans

[57] ABSTRACT

A data processing system includes a memory access control unit having a cache memory, an address array, a plural storage stage recirculating address pipeline and a plural storage stage recirculating data pipeline. An address inquiry to the address array indicates whether or not corresponding data is stored in the cache memory. If the data is available from the cache memory, it is read out to a storage stage in the data pipeline and supplied to the requester. If the data is not available from the cache memory, an access request is sent to the main memory. Until there is a response from the main memory the requested address is recirculated in the address pipeline. The main memory supplies the requested data to a storage stage in the data pipeline, from which it is transferred to a requester. When data is to be written into a memory and the cache memory is not accessible, the data is recirculated in the data pipeline until access to the main memory is possible.

8 Claims, 3 Drawing Sheets

MEMORY ACCESS CONTROL SYSTEM

BACKGROUND OF THE INVENTION

The present invention relates to a memory access control system for use in a data processing system and, more particularly, to an internal processing system for a memory access control unit, connected to arithmetic processors, input/output processors and a main memory unit, for centralized management and processing of memory access requests from the processors. The memory access control unit here may be one having a large-capacity cache memory of either a store-in or a store-through type.

The above-mentioned memory access control system, also known as a system control unit, is required to impartially and efficiently process memory access requests from a plurality of requesters. If it has a cache memory within, such operations as discrimination between a cache hit and a cache miss and, in the case of a miss, the transfer of block data to and from the main memory may complicate its control logic.

U.S. Pat. No. 4,317,168 concerns a cache organization for data transfers for line fetch and line castout between a store-in type cache memory and a main memory unit. Though it somewhat differs from the present invention in that the presence of only one requester unit is tacitly presupposed, it is nevertheless true that efficient use of such a store-in type cache memory requires much ingenuity and a great deal of hardware. Thus, a line fetch or line castout invited by a cache miss, or competition on the same bank in an interleaved cache memory could disturb the pipeline and thereby complicate the control.

Such a disturbance of the pipeline could be even more serious in a memory access control unit which has to accept accesses from a plurality of requesters. Besides simple cache misses, there occur diverse competitions—those between cache memory banks, between set addresses in a set-associative type cache memory, between cache-missing requests for main memory access, and between line fetch/castout processing and the following cache hit processing—within such a unit, and they all can disturb the pipeline. Where there are a plurality of requesters, even if any of such competitions occurs, other requests than the competing ones have to be processed without delay. On the other hand, any request whose processing is held up by a cache miss or competition should be prevented from being outrun by any subsequent request from the same requester.

Usually, in such cases as the above-mentioned where processing cannot be achieved in a pipeline flow, the request or memory access concerned is led out of the pipeline, and processed after being kept waiting in a buffer or a queue provided particularly for each case. During this wait, the processing of subsequent requests from the same requester should be prohibited. These pipeline disturbing factors necessitate a number of buffers and a circuit to control them or the overall flow of requests, resulting in a great deal of complex hardware.

SUMMARY OF THE INVENTION

An object of the present invention is, therefore, to provide a memory access control system of reduced in hardware and dispensing with the above-mentioned buffers and queues in a memory access control unit for accepting and processing accesses from a plurality of requesters.

Another object of the invention is to provide a memory access control system capable of reducing the complexity of control due to the presence of plural requesters.

Still another object of the invention is to provide a memory access control system capable of obviating the complexity of control due to the presence therein of a store-in type cache memory.

Yet another object of the invention is to provide a memory access control system capable of minimizing the effects of any cache miss or competition that may occur on other requests.

A memory access control system according to the present invention is characterized in that it has a cyclically connected pipeline and a group of control information (circulating as do the requests) annexed to requests at different stages of the pipeline and indicating the status of each, and in that all judgments and controls from the start until the end of request processing are within the pipeline. Thus, any request, once having entered the pipeline, never leaves the pipeline before it has gone through the whole processing. Every operation, such as access to the main memory or sending of a reply to the requester, is done only at a specific stage, and all the information necessary for every processing action is basically included in the information accompanying each request.

According to the present invention, the control circuit at each stage primarily needs no more information than what is present at the stage for passing judgment, and its logic is accordingly simplified. At the same time, as the pipeline always regularly circulates, each request can be prevented from disturbing the process of any subsequent request.

A first system according to a first aspect of the invention is a memory access control system connected to requester units and a main memory, and processing memory accesses from the requester units, comprising:

pipeline control means for achieving pipeline control for successive processing of memory addresses and data;

plural stages of pipeline unit means for selectively storing and reading out addresses and data on the basis of instructions from the pipeline control means;

cyclic address connecting means for so connecting, out of the plural stages of pipeline unit means, those unit means relating to addresses as to cause the addresses to circulate; and cyclic data connecting means for so connecting, out of the plural stages of pipeline unit means, those unit means relating to data as to cause the data to circulate.

A second system according to a second aspect of the invention is a memory access control system, such as the first system above, wherein said pipeline control means includes busy check means responsive to a failure of requirements for accessibility to said main memory to be met for causing said address and data to circulate on said cyclic address connecting means, said cyclic data connecting means and said plural stages of pipeline unit means, and deciding in every cycle of this circulation whether or not the requirements for accessibility to said main memory have been met.

A third system according to a third aspect of the invention is a memory access control system, such as the first system above, further including:

address storage means for taking out an address from at least one or the other of said plural stages of pipeline unit means and said cyclic address connecting means and storing it after an access request to said main memory and before response to and receipt of this access request;

data storage means for taking out data from at least one or the other of said plural stages of pipeline unit means and said cyclic data connecting means and storing it after the access request to said main memory and before receipt of a response to this access request; and processing means for performing processing by the use of data from said data storage means and an address from said address storage means.

BRIEF DESCRIPTION OF THE DRAWINGS

Other objects, features and advantages of the present invention will become more apparent from the detailed description hereunder when taken in conjunction with the accompanying drawings, wherein:

In FIGS. 1 to 3, the same reference numerals denote respectively the same or corresponding structural elements.

DETAILED DESCRIPTION OF THE PREFERRED EMBODIMENTS

Figure 1:
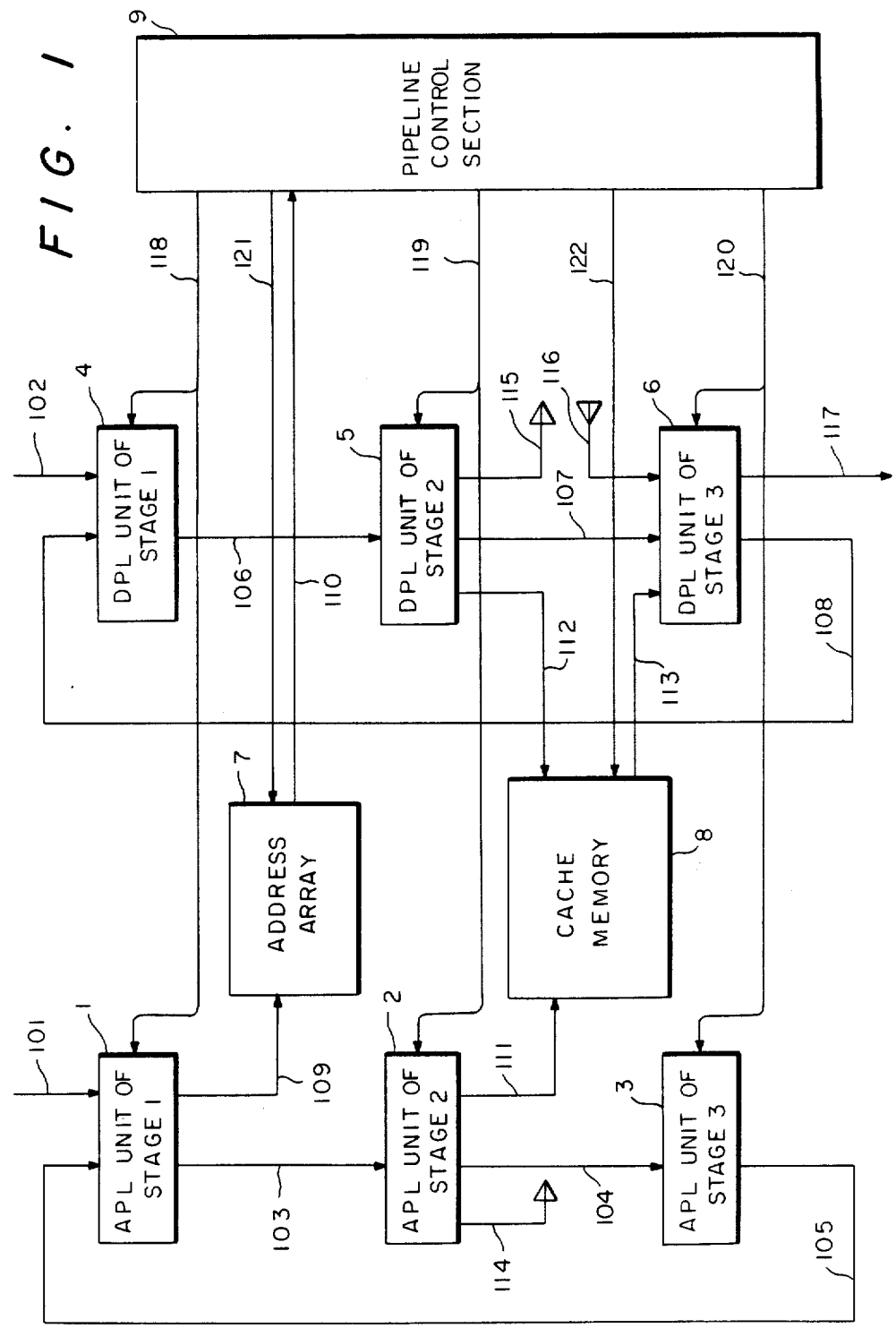
FIG. 1 is a diagram illustrating a first embodiment of the invention.

Referring to FIG. 1, a first embodiment of the present invention comprises an address pipeline (APL) unit 1 of stage 1 for accepting an address given by way of a line 101 in response to a memory access request; an APL unit 2 of stage 2 for storing an address given by way of a line 103 from the APL unit 1 of stage 1; an APL unit 3 of stage 3 for storing an address given through a line 104 from the APL unit 2 of stage 2 and feeding it back to the APL unit 1 of stage 1 via a line 105; a cache memory 8 for storing the same data as data in a main memory (not shown) in a position indicated by an address given from the APL unit 2 by way of a line 111; an address array 7 for registering the address of data stored in the cache memory 8; a data pipeline (DPL) unit 4 of stage 1 for storing data given through a line 102 in response to a memory access request; a DPL unit 5 of stage 2 for storing data given through a line 106 from the DPL unit 4 of stage 1; a DPL unit 6 of stage 3 for storing data given through a line 107 from the DPL unit 5 of stage 2 and feeding it back to the DPL unit 4 of stage 1 through a line 108; and a pipeline control section 9 for deciding, on the basis of a signal supplied by way of a signal line 110, whether or not data corresponding to an address from a requester are registered in the cache memory 8 and whether or not an access address from a requester is registered in the address array 7, instructing selective outputting and storage to the units 1 to 6 of the different stages of the pipeline through lines 118 to 120, instructing reading out of and writing into the address array 7 and the cache memory 8 through lines 121 and 122, respectively, and executing these decisions and instructions as sequential control.

On this pipeline, addresses and data present in the units 1 and 4, respectively, of stage 1 are written in one clock cycle into the units 2 and 5 of the next stage 2. Similarly, addresses and data stored in the units 2 and 5 are transferred in one clock cycle to and stored in the units 3 and 6 of stage 3, and addresses and data stored in the units 3 and 6 are transferred to and stored in the units 1 and 4 of stage 1. Therefore, data and address complete a full round of the pipeline in three clock cycles.

At stage 1 of this pipeline, a memory access request is accepted; the address array 7 is searched at stages 1 to 2; writing into and reading out of the cache memory 8 are performed at stages 2 to 3; and data are returned to the requester at stage 3.

Now will be sequentially explained in detail the operation of the first embodiment of the invention. Referring to FIG. 1, in response to a memory access request, an address provided through the line 101 is stored in the APL unit 1 of stage 1, and data provided via the line 102 are stored in the DPL unit 4 of stage 1. In response to an address accessed from the APL unit 1 of stage 1 via the line 109, the address array 7 compares the accessed address with addresses stored therein. The addresses of data stored in the cache memory 8 are registered in the address array 7, and if said comparison identifies the accessed address with a registered address, it will mean the presence of desired data in the cache memory (i.e. a cache hit). Information to indicate whether or not there has been a cache hit is given to the pipeline control section 9 through the line 110. In response to a cache hit signal and a read/write instruction of the memory access request, an address access to the cache memory 8 is instructed from the pipeline control section 9 to the APL unit 2 via the line 119. If the memory access request is a write instruction, an instruction to supply data to the cache memory 8 is given from the pipeline control section 9 to the DPL unit 5 through the line 119 along with the address access instruction. In response to these instructions, an address is supplied from the APL unit 2 to the cache memory 8 through the line 111. If said memory access request is a write instruction, data are supplied, in response to an instruction from the pipeline control section 9, from the DPL unit 5 to the cache memory 8 via the line 112. The cache memory 8 stores the data given via the line 112 in the position instructed by the address given via the line 111. If said memory access demand is a read instruction, the cache memory 8 reads out data from the position instructed by the address given through the line 111, and supplies them to the DPL unit 6 of stage 3 by way of a line 113. This DPL unit 6, after once fetching the data provided via the line 113, provides the data to the requester by way of a line 117.

Next will be described in detail the operation that will take place in the event of a cache miss. A cache miss means a failure of the address array 7 to identify an access address given through the line 109 with an address stored therein owing to the absence of data demanded by a requester in the cache memory 8.

If the address array 7 and the pipeline control section 9 decide that a cache miss has occurred, the access request from the requester should be sent to the main memory. This access request to the main memory is sent from the units 2 and 5 of stage 2 on the pipeline. Thus, the address is supplied from the APL unit 2 to the main memory through a line 114 and, at the same time, the data are supplied from the DPL unit 5 to the main memory by through a line 115.

One of the features of the present invention is that, until there is a response from the main memory after an access request, the pertinent address and data are fed to the stage at every clock time and maintained within the pipeline.

Data provided from the main memory (not shown) through a line 116 are accepted by the DPL unit 6 of stage 3, and returned to the requester via the line 117. Along with this, data from the DPL unit 6 are written as required into the cache memory 8 through the line 108, the DPL unit 4, the line 106, the DPL unit 5 and a line 112. Addresses corresponding to these data to be written are registered from the APL unit 1 of stage 1 into the address array 7 through the line 109.

The circulation of the address for memory access, data and control information on the pipeline, which constitutes another feature of the present invention, dispenses with buffers to keep those pieces of information and thereby serves to reduce the amount of hardware needed.

There is the further advantage that, irrespective of whether or not data corresponding to the memory address for memory access are present in the cache memory 8, the same pipeline can handle the access request.

Now will be described in detail a second embodiment of the present invention with reference to FIG. 2.

Figure 2:
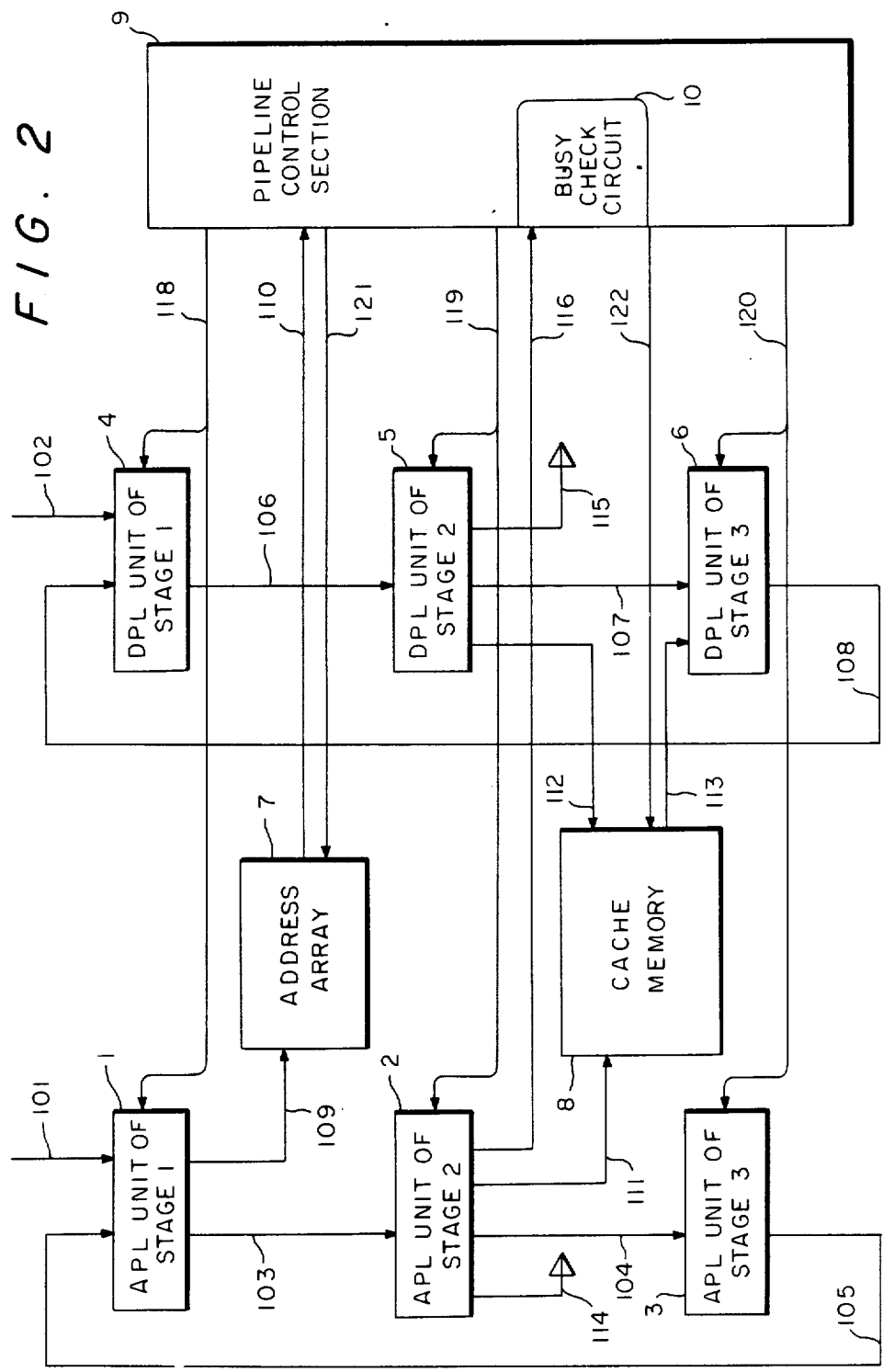
FIG. 2 is a diagram illustrating a second embodiment of the invention.

Referring to FIG. 2, the second embodiment of the present invention is substantially the same as that illustrated in FIG. 1 except that the pipeline control section 9 in this version has a busy check circuit 10.

This busy check circuit 10, based on an address given from the APL unit 2 of stage 2 through the line 116 and the operating status of the main memory (not shown), judges whether or not the system is in a state permitting a memory access request at stage 2 to be supplied to the main memory.

Next will be described in detail the operations of the second embodiment of the invention with reference to the pertinent drawing in FIG. 2.

The operation in the case of a cache hit is the same as with the first embodiment described above. Therefore the following detailed description will concern the operation in the case of a cache miss.

Upon a decision that there is a cache miss by the address array 7 and the pipeline control section 9, the access request from the requester has to be sent to the main memory. This access request for the main memory is sent out from the units 2 and 5 of stage 2 of the pipeline. Thus, as the address is supplied from the APL unit 2 to the main memory through the line 114, so the data are fed from the DPL unit 5 to the main memory via the line 115.

At this time, the busy check circuit 10, which is a specific feature of this embodiment, judges whether or not the system is in a state permitting the memory access request at stage 2 to be supplied to the main memory, on the basis of the address given from the APL unit 2 of stage 2 via the line 116 and the operating status of the main memory.

In response to the decision by this busy check circuit 10 affirming accessibility, the access demand is supplied from the units 2 and 5 of stage 2 to the main memory. If the decision by the busy check circuit 10 denies accessibility, the address and data from the units 2 and 5, respectively, of stage 2, are transferred to the units 3 and 6, respectively, of stage 3, and circulate along the pipeline. When the same address and data as those of the memory access request have again come to the units 2 and 5, respectively, of stage 2, the busy check circuit 10 again makes a decision as to whether or not the requirements for access to the main memory are met. A second decision of inaccessibility (busy) would mean that the access request cannot yet be sent to the main memory. Therefore, in response to this busy check, the circulated address and data would make another round of the pipeline. This sequence of actions is repeated until this particular memory access request is sent out to the main memory.

The specific feature of the second preferred embodiment of the present invention resides in the operation whereby, if the main memory is inaccessible, the address, data and control information for memory access are circulated along the pipeline to wait, and the accessibility is judged by the busy check circuit 10 every time they have completed a round of the pipeline. This feature has the advantage of dispensing with a buffer which would otherwise be needed for holding the above-described items of information, and thereby helping to reduce the amount of hardware. It also has the further advantage of allowing the memory access of a memory address to be handled by the same pipeline irrespective of the presence or absence of the corresponding data in the cache memory.

Now will be described in detail a third embodiment of the present invention with reference to FIG. 3.

Figure 3:
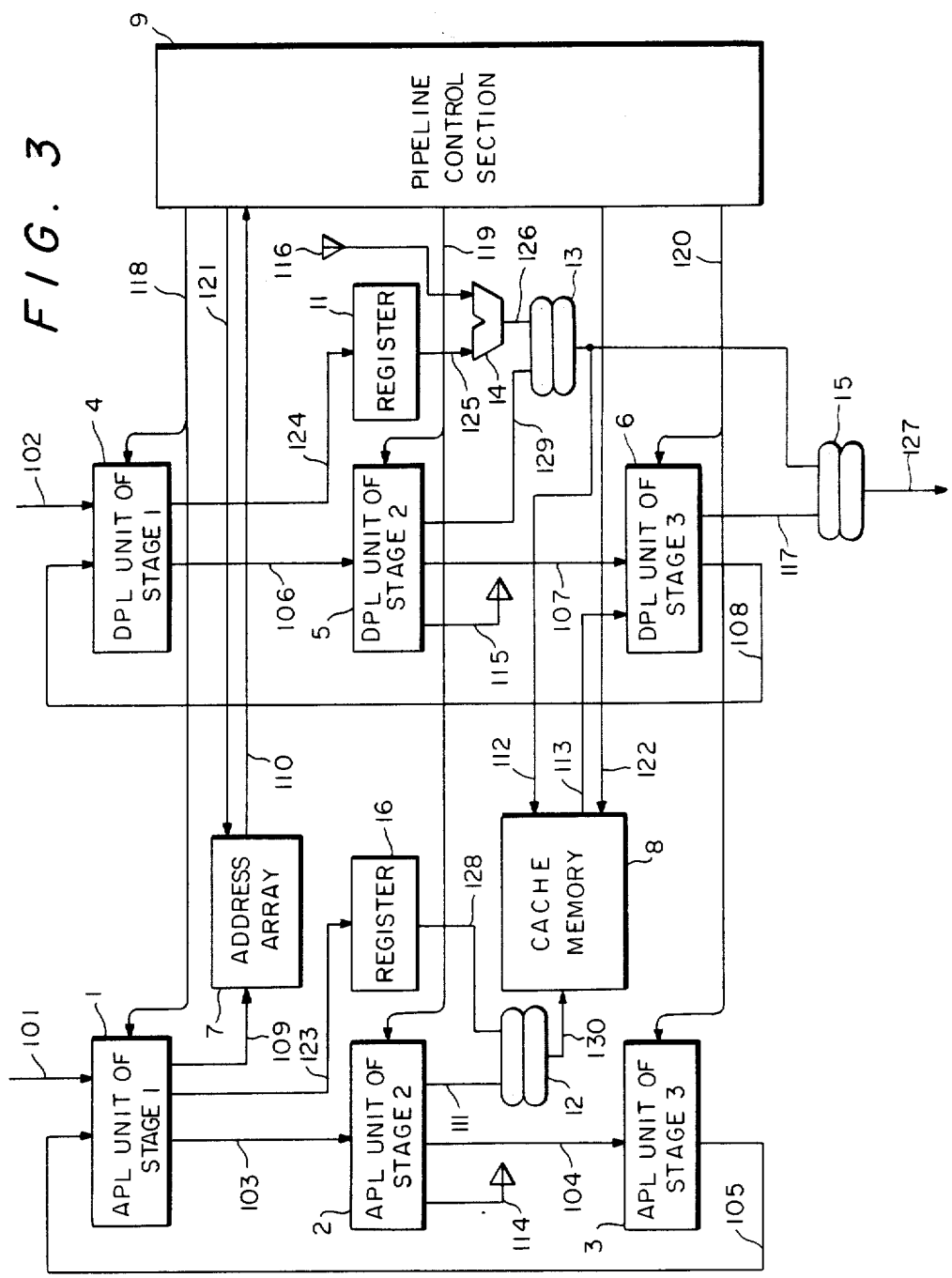
FIG. 3 is a diagram illustrating a third embodiment of the invention.

Referring to FIG. 3, the third embodiment of the invention has the following characteristic circuits in addition to the first embodiment illustrated in FIG. 1.

The third embodiment is characterized in that it has registers 16 and 11 responsive to a request from stage 2 for storing an address and data provided from the units 1 and 4 of stage 1 through lines 123 and 124, respectively, at such a time as will permit the quickest return of the response from the main memory (not shown); an arithmetic unit 14 for subjecting to an arithmetic operation data provided from the register 11 through the line 125 and data provided from the main memory via the line 116; a selector 13 for selecting either the result of the arithmetic operation provided from the arithmetic unit 14 by way of a signal line 126 and data provided from the DPL unit 5 through a signal line 129, and sending whichever is selected to the cache memory 8 via the signal line 112; another selector 12 for choosing, in order to give the access address of access data to the cache memory 8, between an address provided from the register 16 by way of a signal line 128 and another address provided from the APL unit 2 via the signal line 111; and still another selector 15 for choosing between data provided from the selector 13 through the signal line 112 and data given from the DPL unit 6 through the signal line 117, and returning whichever is chosen to the requester by way of a line 127.

Next will be described in detail the operation of the third embodiment of the invention with reference to the pertinent drawing in FIG. 3.

The operation in the case of a cache hit is the same as with the first and second embodiments described above. Therefore, the following detailed description will concern the operation in the case of a cache miss.

In response to a decision of a cache miss by the address array 7 and the pipeline control section 9, an access request to the main memory is sent out from the units 2 and 5 of stage 2 of the pipeline on the signal lines 114 and 115, respectively. The same address and data as those of the memory access request are transferred to the next stage at every clock time and thereby let circulate along the pipeline. Having made a round of the pipeline, the address and data are stored in the registers 16 and 11 through the signal lines 123 and 124, respectively. The register 11 holds the data until data responding to the access request are returned from the main memory via the signal line 116. These data provided from the register 11 through the line 125 and the data provided from the main memory via the line 116 are subjected an arithmetic operation by the arithmetic unit 14, and the result of the operation is stored in the cache memory 8 via the signal line 126, the selector 13 and the signal line 112. The access address, indicating the storage position in the cache memory 8, is provided from the register 16 to the cache memory 8 via the signal line 128, the selector 12 and the signal line 130. The data given to the cache memory 8 are at the same time returned to the requester through the selectors 13 and 15 and the signal line 127.

The sequence of processing after the response from the main memory is started, is triggered by this very response.

The specific feature of the third embodiment of the present invention thus resides in the memory address and data for the memory access being extracted from the pipeline and caused to stand by after access to the main memory is demanded but before the response is returned from the main memory, and necessary processing is started when triggered by the response to the memory access. This feature dispenses with the need for waiting to adjust the time with the pipeline after the response from the main memory, and further permits control without giving heed to the several types of main memory access time, resulting in the advantage that the control is simplified along with performance improvement at the time of accessing the memory unit.

Although the three embodiments described were assumed to have three-stage pipelines for the sake of facilitating understanding, a satisfactory pipeline for practical purposes should desirably have more than three stages, for instance six.

What is claimed is:

1. A memory access control system coupled to requester units and a main memory, and processing memory access requests from said requester units, comprising:
   pipeline control means providing instructions for achieving pipeline control for successive processing of memory addresses and data;
   plural stages of pipeline unit means for selectively storing and reading out said addresses and said data in response to said instructions from said pipeline control means;
   input means for providing said addresses and data to at least one stage of said pipeline unit means in response to said memory access requests;
   cyclic address coupling means for so coupling, from among said plural stages of said pipeline unit means, those particular stages of said pipeline unit means relating to particular address as to cause said particular addresses to circulate in response to said pipeline control; and
   cyclic data coupling means for so coupling, from among said plural stages of said pipeline unit means, those particular stages of said pipeline unit means relating to particular data as to cause said particular data to circulate in response to said pipeline control.

2. A memory access control system, as claimed in claim 1, wherein said pipeline control means includes:
   busy check means, responsive to a failure of requirements for accessibility to said main memory to be met, for causing said particular addresses and said particular data to circulate in said cyclic address coupling means, said cyclic data coupling means and said plural stages of said pipeline unit means, and for deciding in every cycle of circulation whether or not said requirements for accessibility to said main memory have been met.

3. A memory access control system, as claimed in claim 1, further including:
   address storage means for taking out an address from at least one or the other of said plural stages of said pipeline unit means and said cyclic address coupling means and storing said address after an access demand to said main memory and before receipt of a response from said main memory to said access request;
   data storage means for taking out data from at least one or the other of said plural stages of said pipeline unit means and said cyclic data coupling means and storing said data after said access demand to said main memory to this access demand; and
   processing means for performing processing by the use of said data from said data storage means and said address from said address storage means.

4. A control system for processing memory access requests, comprising:
   recirculating address and data pipeline means for transferring address signals and data signals at least within said recirculating pipeline means in response to said requests;
   input means for providing said address signals and said data signals to said recirculating pipeline means in response to said requests; and
   pipeline control means for controlling transferral of said address signals and said data signals at least within said recirculating pipeline means.

5. A control system as claimed in claim 4, further comprising:
   cache memory means for writing in/reading out said data signals, said cache memory means coupled to said recirculating pipeline means and responsive to said control means; and
   storage means coupled to said recirculating pipeline means for storing address signals corresponding to locations in said cache memory means.

6. A control system as claimed in claim 5, further comprising:
   means for providing access to a main memory;
   wherein said pipeline control means includes means for checking said access to said main memory.

7. A control system as claimed in claim 6, further comprising:
   selector means coupled to said recirculating pipeline means for determining transferral of said data signals to said cache memory means and said main memory.

8. A control system as claimed in claim 4, wherein said recirculating pipeline means includes:
   recirculating address pipeline means for transferring said address signals in response to said requests; and
   recirculating data pipeline means for transferring said data signals in response to said requests.

* * * * *